US012691400B2

(12) United States Patent
Caliendo

(10) Patent No.: US 12,691,400 B2
(45) Date of Patent: Jul. 28, 2026

(54) AIRBOX WITH DEBRIS REMOVAL SYSTEM

(71) Applicant: Caterpillar Inc., Peoria, IL (US)

(72) Inventor: Vincent Paul Caliendo, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 332 days.

(21) Appl. No.: 18/243,911

(22) Filed: Sep. 8, 2023

(65) Prior Publication Data

US 2025/0083082 A1 Mar. 13, 2025

(51) Int. Cl.
| | |
|---|---|
| *B01D 46/00* | (2022.01) |
| *B01D 46/52* | (2006.01) |
| *B01D 46/71* | (2022.01) |
| *F02M 35/02* | (2006.01) |
| *F02M 35/024* | (2006.01) |
| *F02M 35/08* | (2006.01) |

(52) U.S. Cl.
CPC ....... *B01D 46/0041* (2013.01); *B01D 46/521* (2013.01); *B01D 46/71* (2022.01); *F02M 35/0202* (2013.01); *F02M 35/0245* (2013.01); *F02M 35/084* (2013.01); *F02M 35/086* (2013.01); *B01D 2271/022* (2013.01); *B01D 2273/30* (2013.01); *B01D 2279/60* (2013.01)

(58) Field of Classification Search
None
See application file for complete search history.

(56) References Cited

U.S. PATENT DOCUMENTS

| | | | | |
|---|---|---|---|---|
| 3,375,641 | A * | 4/1968 | Labbe | ................... B01D 46/76 55/293 |
| 5,400,753 | A | 3/1995 | Andress et al. | |
| 5,425,188 | A * | 6/1995 | Rinker | .............. B01D 46/0002 175/206 |
| 6,458,178 | B1 * | 10/2002 | Dietz | ................ B01D 46/4272 55/284 |
| 6,605,131 | B2 | 8/2003 | Vanderveen et al. | |
| 8,529,324 | B2 | 9/2013 | Moredock et al. | |
| 11,339,750 | B2 | 5/2022 | Sheidler et al. | |
| 2003/0041729 | A1 * | 3/2003 | Finigan | .................. B01D 46/04 95/280 |
| 2011/0226130 | A1 * | 9/2011 | Kienzle | ................. B01D 46/24 95/280 |

(Continued)

FOREIGN PATENT DOCUMENTS

| | | |
|---|---|---|
| CN | 2707988 | 7/2005 |
| CN | 202746048 | 2/2013 |

(Continued)

*Primary Examiner* — Brit E. Anbacht

(57) ABSTRACT

An airbox includes an intake air inlet in a housing, wherein the intake air inlet includes a first portion and a second portion, at least one air outlet in the housing, and an air chamber within the housing and fluidly connected to the intake air inlet and the at least one air outlet. The air chamber includes an internal wall that divides the air chamber along an axis thereof into a first air chamber portion fluidly connected to the first portion of the air inlet and a second air chamber portion fluidly connected to the second portion of the air inlet, and a moveable air inlet damper configured to seal the first portion of the air inlet and occlude the first air chamber portion, or to seal the second portion of the air inlet and occlude the second air chamber portion.

21 Claims, 7 Drawing Sheets

(56) References Cited

U.S. PATENT DOCUMENTS

2013/0008308 A1     1/2013  Govindappa et al.

FOREIGN PATENT DOCUMENTS

| | | |
|---|---|---|
| CN | 106089513 | 8/2018 |
| CN | 111396220 | 7/2020 |
| CN | 114233539 | 3/2022 |
| DE | 102008038564 | 2/2010 |
| DE | 102013019689 | 5/2015 |
| FR | 3028564 | 5/2016 |
| KR | 100663014 | 12/2006 |
| KR | 101506298 | 3/2015 |

* cited by examiner

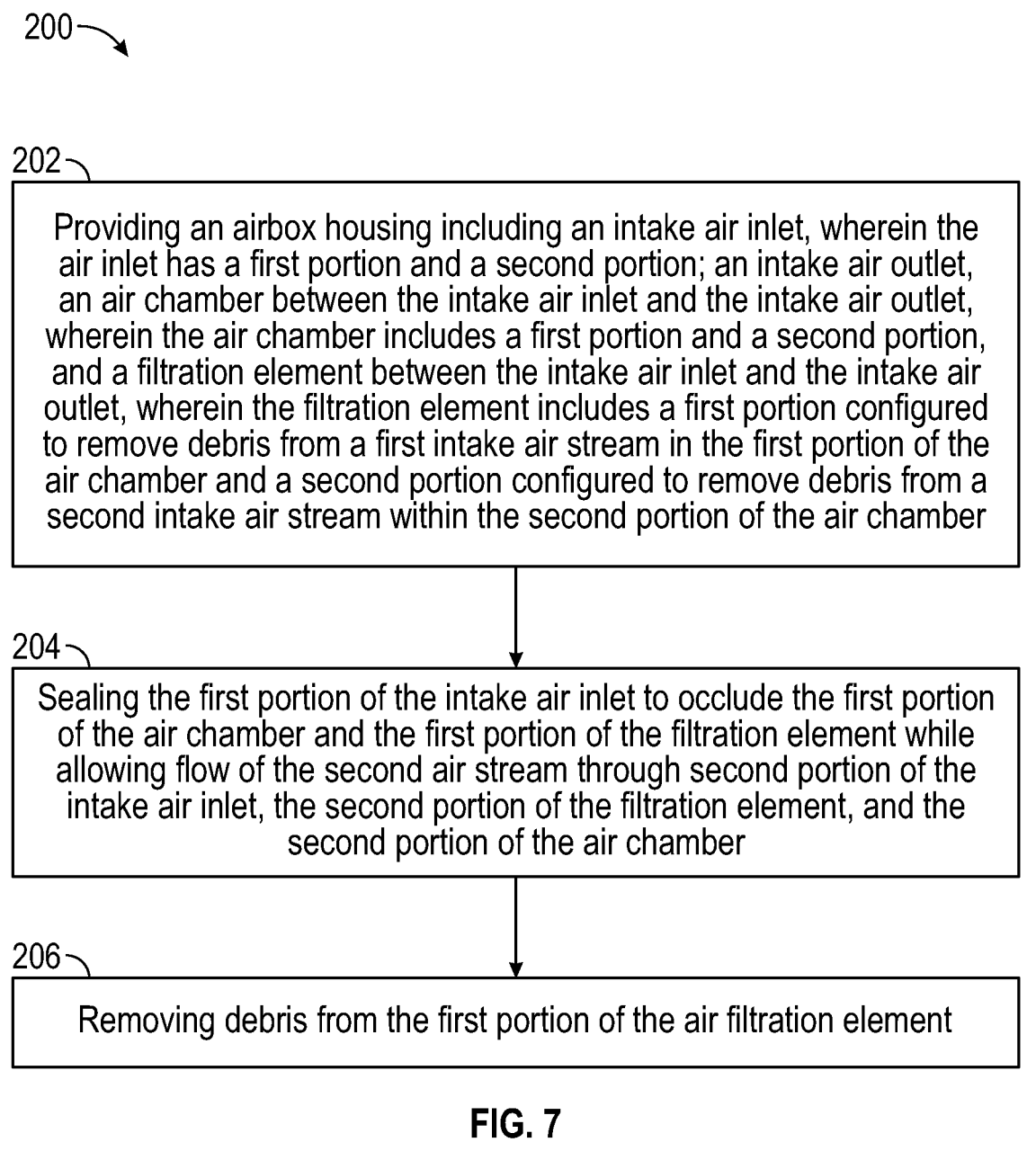

200

202

Providing an airbox housing including an intake air inlet, wherein the air inlet has a first portion and a second portion; an intake air outlet, an air chamber between the intake air inlet and the intake air outlet, wherein the air chamber includes a first portion and a second portion, and a filtration element between the intake air inlet and the intake air outlet, wherein the filtration element includes a first portion configured to remove debris from a first intake air stream in the first portion of the air chamber and a second portion configured to remove debris from a second intake air stream within the second portion of the air chamber

204

Sealing the first portion of the intake air inlet to occlude the first portion of the air chamber and the first portion of the filtration element while allowing flow of the second air stream through second portion of the intake air inlet, the second portion of the filtration element, and the second portion of the air chamber

206

Removing debris from the first portion of the air filtration element

FIG. 7

AIRBOX WITH DEBRIS REMOVAL SYSTEM

TECHNICAL FIELD

This disclosure relates to a cleaning mechanism for a filtration element in an airbox.

BACKGROUND

An airbox includes a removable filtration element that removes particulate matter from an intake air stream before the intake air stream enters a device. For example, some vehicular airboxes include a removable paper or oiled foam filtration element that traps particulates in the engine intake air before the engine intake air passes into the engine intake system. Unless the filter element in the airbox is cleaned and serviced periodically, restrictions in intake flow through the filter element can reduce engine performance and increase vehicular fuel consumption. Airboxes used in heavy duty work machines such as, for example, backhoes, excavators, tractors, skid-steer loaders, compactors, and the like, operate in dirty and dusty environments, which can require frequent filter element service. Airboxes used in heavy machinery can include mechanisms for periodically removing debris from the filter element, and suitable examples are described in, for example, CN202746048, DE12838564, U.S. Pat. No. 8,529,324, CN106089513, CN2707988, U.S. Pat. No. 6,605,131, and CN111396220.

SUMMARY OF THE INVENTION

Limited under hood space for the airbox housing in heavy duty work machinery also limits the size of the filtration element within the housing. Smaller filtration elements can require more frequent servicing, which can reduce the lifespan of the filtration element and require more frequent filtration element replacement. Shorter service intervals increase vehicular operation costs and increase machine down time.

In one aspect, the present disclosure is directed to an airbox with a filtration element between an intake air inlet and an intake air outlet. The intake air inlet of the airbox includes a moveable damper that can be moved into position to seal off a first portion of the air inlet and block the passage of intake air into a first portion of the air filtration element, while allowing continued flow of intake air through a second portion of the intake air inlet and into a second portion of the filtration element. Particulate matter can be removed from the first portion of the filtration element, while intake air continues to flow through the second portion of the filtration element. Since intake air continues to flow through the second portion of the filtration element, a device downstream of the airbox can continue to operate during the cleaning procedure.

In one example, the airbox includes an intake air inlet with a first portion and a second portion, and at least one intake air outlet. An air chamber between the intake air inlet and the intake air outlet includes a first portion fluidly connected to the first portion of the intake air inlet and a second portion fluidly connected to the second portion of the intake air inlet. A filtration element resides between the intake air inlet and the intake air outlet, and the filtration element includes a first portion configured to remove debris from a first intake air stream in the first portion of the air chamber and a second portion configured to remove debris from a second intake air stream within the second portion of the air chamber.

The first portion of the intake air inlet or the second portion of the intake air inlet may be selectively sealed with a moveable damper to block the first intake air stream or the second intake air stream, which in turn occludes either the first air chamber and the first portion of the filtration element, or the second air chamber and the second portion of the filtration element. Debris may be removed from the occluded portion of the filtration element with a cleaning device attached to the airbox such as, for example, a pulsed air cleaning device. The debris may then optionally be entrained within an exhaust air stream generated by, for example, an axial or centrifugal fan, and removed from the airbox.

During cleaning of the occluded portion of the filtration element, the intake air stream continues to flow through the unoccluded portion of the intake air inlet, the unoccluded portion of the air chamber, and the associated unoccluded portion of filtration element. The flow of the intake air stream into the engine through the unoccluded regions of the air chamber and the filtration element allows continued machine operation as the filtration element is cleaned, which can reduce device downtime. In vehicular applications, the airbox design including the moveable damper also reduces the size of the filtration element, which can preserve under-hood space in the vehicle.

BRIEF DESCRIPTION OF THE DRAWINGS

FIG. 7 is a flow chart of a method for removing debris from an air filtration element in an airbox of the present disclosure.

Like symbols in the drawings represent like elements.

DETAILED DESCRIPTION

Figure 1:
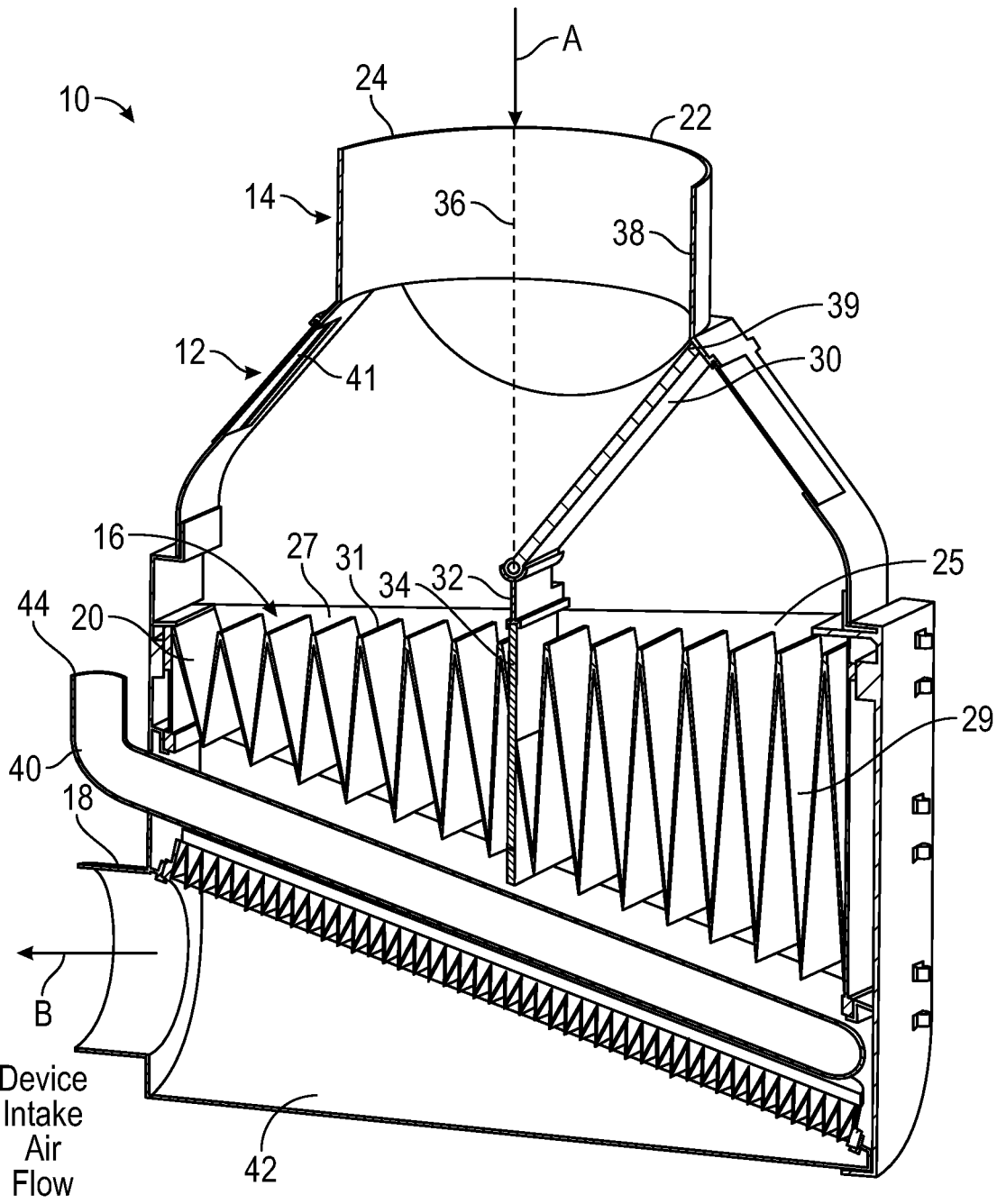
FIG. 1 is a schematic cross-sectional view of an embodiment of an airbox according to the present disclosure.

Referring now to FIG. 1, an airbox 10 includes a housing 12 with an intake air inlet 14 configured for intake of an outside air stream moving along the direction of the arrow A. The outside air stream includes debris such as, for example, particulate matter, which can potentially harm a device downstream of the airbox 10. The outside air stream passes through the intake air inlet 14 and moves into an air chamber 16, and then into an intake air outlet 18 to form an intake air stream along the arrow B for intake into the downstream device. A filtration element 20 resides between the intake air inlet 14 and the intake air outlet 18. The filtration element 20 may vary widely, and in some examples can include paper materials, oiled foam, and combinations thereof.

A moveable damper 30 articulates on a support member 32, which is attached to a wall 34 dividing the air chamber 16 into a first portion 25 and a second portion 27. In the example of FIG. 1, the wall 34 further divides the filtration element 20 into a first portion 29 and a second portion 31.

When unactivated, the damper 30 resides along a line 36 to minimize disruption of the intake air stream flowing through the intake air inlet 14. When activated to a first position, as shown schematically in FIG. 1, the damper 30 engages a first sealing edge 39 on an interior wall 38 of the housing 12 and blocks a first portion 22 of the intake air inlet 14, while allowing continued intake air stream flow through a second portion 24 of the intake air inlet 14. The seal between the damper 30 and the first sealing edge 39 also occludes the first portion 25 of the air chamber 16, well as the first portion 29 of the filtration element 20, while allowing continued intake air stream flow through the second portion 27 of the air chamber 16, as well as through the second portion 31 of the filtration element 20, and into the intake air outlet 18.

Alternatively, the damper 30 may be activated to a second position (not shown in FIG. 1) against a second sealing edge 41 of the interior wall 38 of the housing 12. In the second position, the damper 30 blocks intake air flow through the second portion of the intake air inlet 24, the second portion 27 of the air chamber 16, well as the second portion 31 of the filtration element 20, while allowing continued intake air stream flow through the first portion 25 of the air chamber 16, as well as through the first portion 29 of the filtration element 20, and into the intake air outlet 18.

While the damper 30 in the example of FIG. 1 has a linear shape, the damper 30 can have any suitable shape to form a seal with the interior wall 38 of the housing 12. In addition, as shown in FIG. 1, the portions 22, 24 of the intake air inlet 14, the portions 25, 27 of the air chamber 16, and the portions 29, 31 of the filtration element 20 can have any suitable size and shape.

Referring again to FIG. 1, when the damper 30 is in the first position, intake air flow does not flow into the first portion 29 of the filtration element 20. The first portion 29 of the filtration element 20 can then be cleaned using any suitable technique, while intake air continues to flow through the second portion 31 of the filtration element 20 and into the air intake outlet 18. In some examples (not shown in FIG. 1), the first portion 29 of the filtration element 20 may be cleaned using techniques such as ultrasonic, pulsed air, blasted air, vibratory, and combinations thereof, to remove at least a portion of debris therefrom.

In some examples, the debris removed from the filtration element 20 may be collected in a channel 40, or may fall onto a region 42 of the interior surface 38 of the housing 12. In some examples, the debris removed from the filtration element 20 may be entrained in an exhaust air flow and expelled from the housing 12 via an exhaust port 44, or may be manually removed from the housing 12 during periodic cleaning procedures.

As the damper 30 is activated and moved to the first position or the second position, intake air flow through at least a portion of the filtration element 16 is maintained, which allows continued operation of the device downstream of the intake air outlet 18 as debris is removed from the filtration element 16.

Referring now to FIGS. 2-6, an embodiment of an airbox 110 for an internal combustion engine includes a housing 112. The housing 112 includes a first wall 114 in a first plane 115, which includes an intake air outlet 116 exhausting into a nozzle 103 and a debris removal port 118 exhausting into a nozzle 105. A second wall 120 of the housing 112 opposite to the first wall 114 and in a plane 117 substantially parallel thereto includes a debris removal device inlet 122 configured to engage at least one debris removal device 124 in a debris removal device module 126. The debris removal device 122 may vary widely, and examples include ultrasonic, pulsed air, blasted air, vibratory, and combinations thereof.

A third wall 130 of the housing 112 extends between the first wall 114 and the second wall 120 thereof, and resides in a plane 131 substantially normal to the first plane 115 and the second plane 117. The third wall 130 includes an intake air inlet 132 that is fluidly connected to the intake air outlet 116, the debris removal port 118, and the debris removal device inlet 122. A moveable damper 134 resides in the intake air inlet 132. The damper 134 may have any suitable shape to engage the intake air inlet 132. The damper 134 articulates about a shaft 138 attached to the housing 112, which resides in a plane substantially parallel to the plane 131 of the third wall 130.

Figure 2:
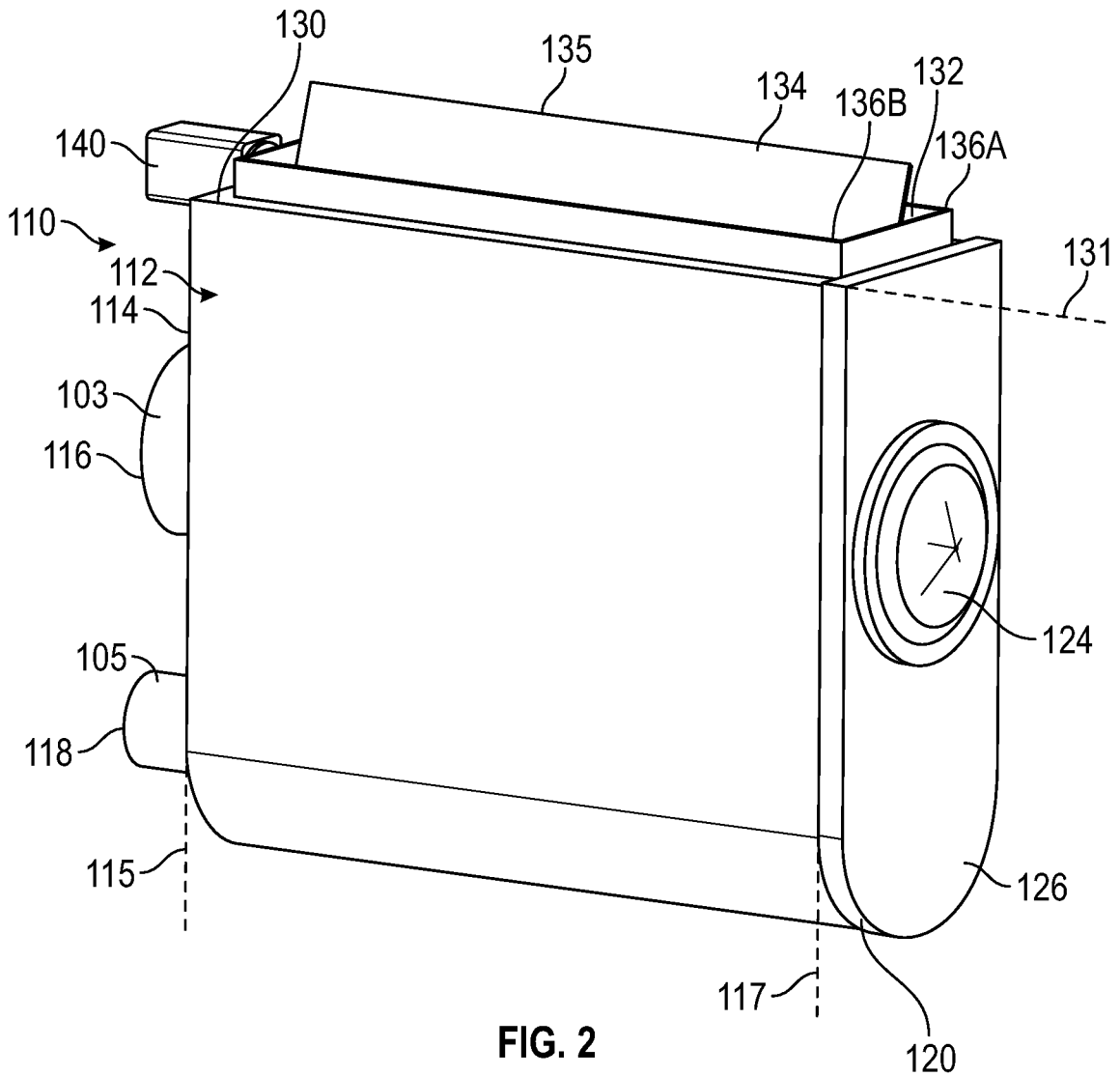
FIG. 2 is a schematic perspective view of an embodiment of an airbox according to the present disclosure.

A motor 140 attached to the shaft 138 moves the damper 134 to predetermined positions to seal against a sealing edge 136A or 136B of the intake air inlet 132. In some examples (not shown in FIG. 2), the damper 134, or the sealing edges 136A, 136B, or both, may optionally include a sealing member. In the example of FIG. 2, the damper 134 includes a seal member 135 to form a more effective seal against the sealing edges 136A, 136B. When the damper 134 is moved by the motor 140 into engagement with the sealing edge 136A, the damper 134 seals a first intake air inlet portion 139A and prevents the flow of an intake air stream therethrough, while allowing intake air flow through a second intake air inlet portion 139B. Alternatively, when the motor 140 moves the damper 134 into engagement with the sealing edge 136B, the damper 134 seals the second intake air inlet portion 139B and allows intake air flow through the first intake air inlet portion 139A.

Figure 3:
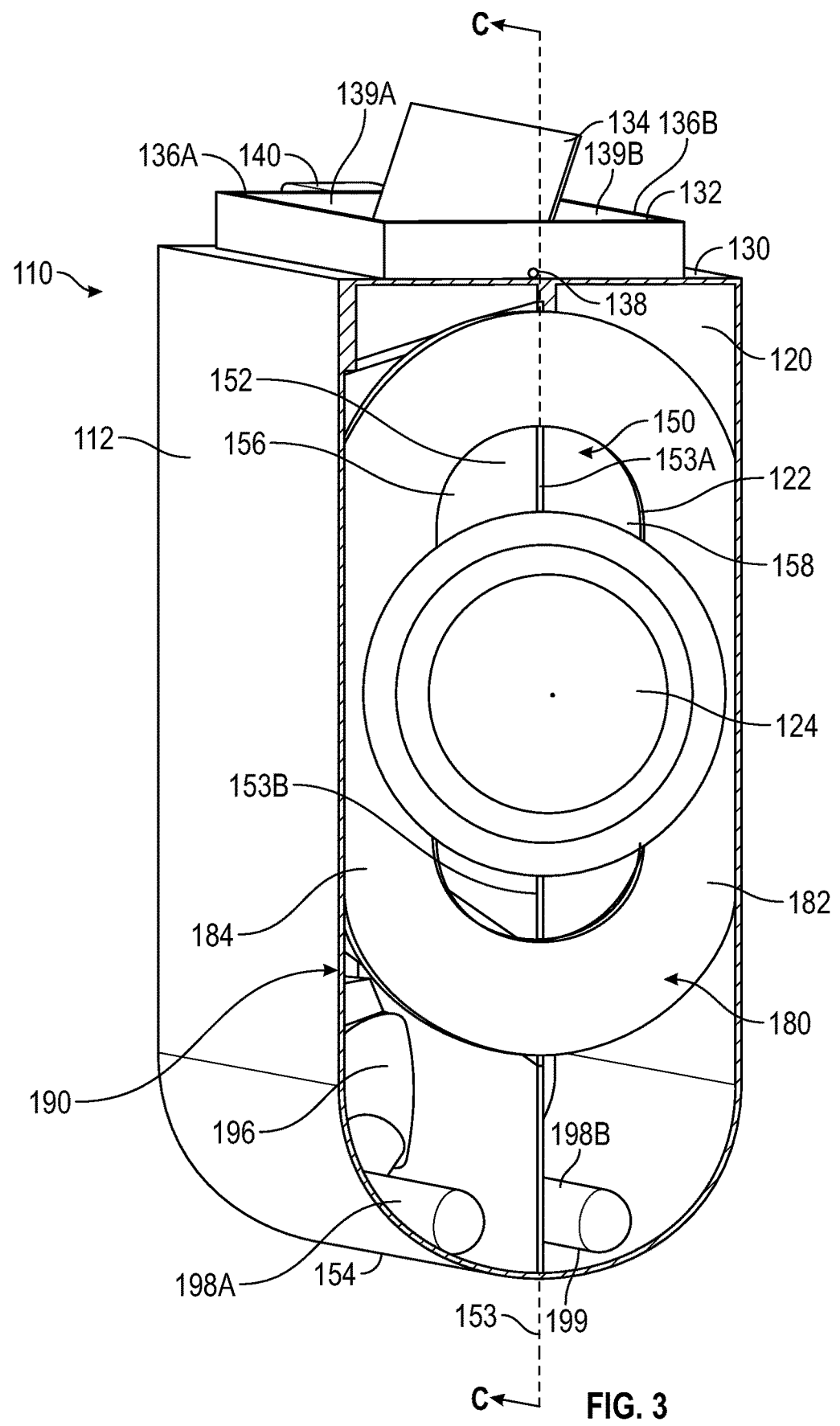
FIG. 3 is a schematic perspective view of an embodiment of an airbox of the present disclosure having an external cover removed and showing a debris removal device.
Figure 5:
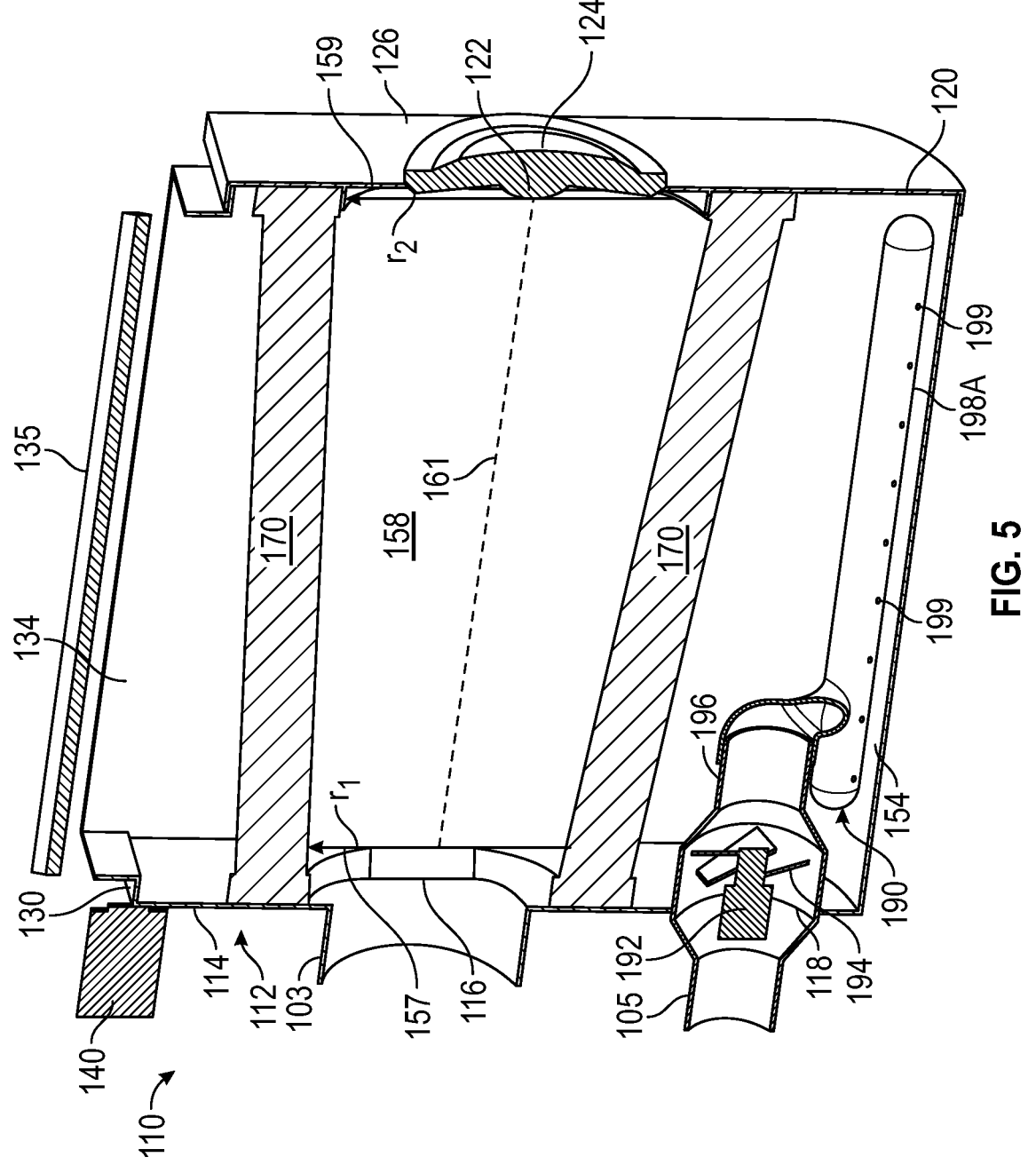
FIG. 5 is a schematic cross-sectional view of an embodiment of an airbox of the present disclosure.
Figure 6:
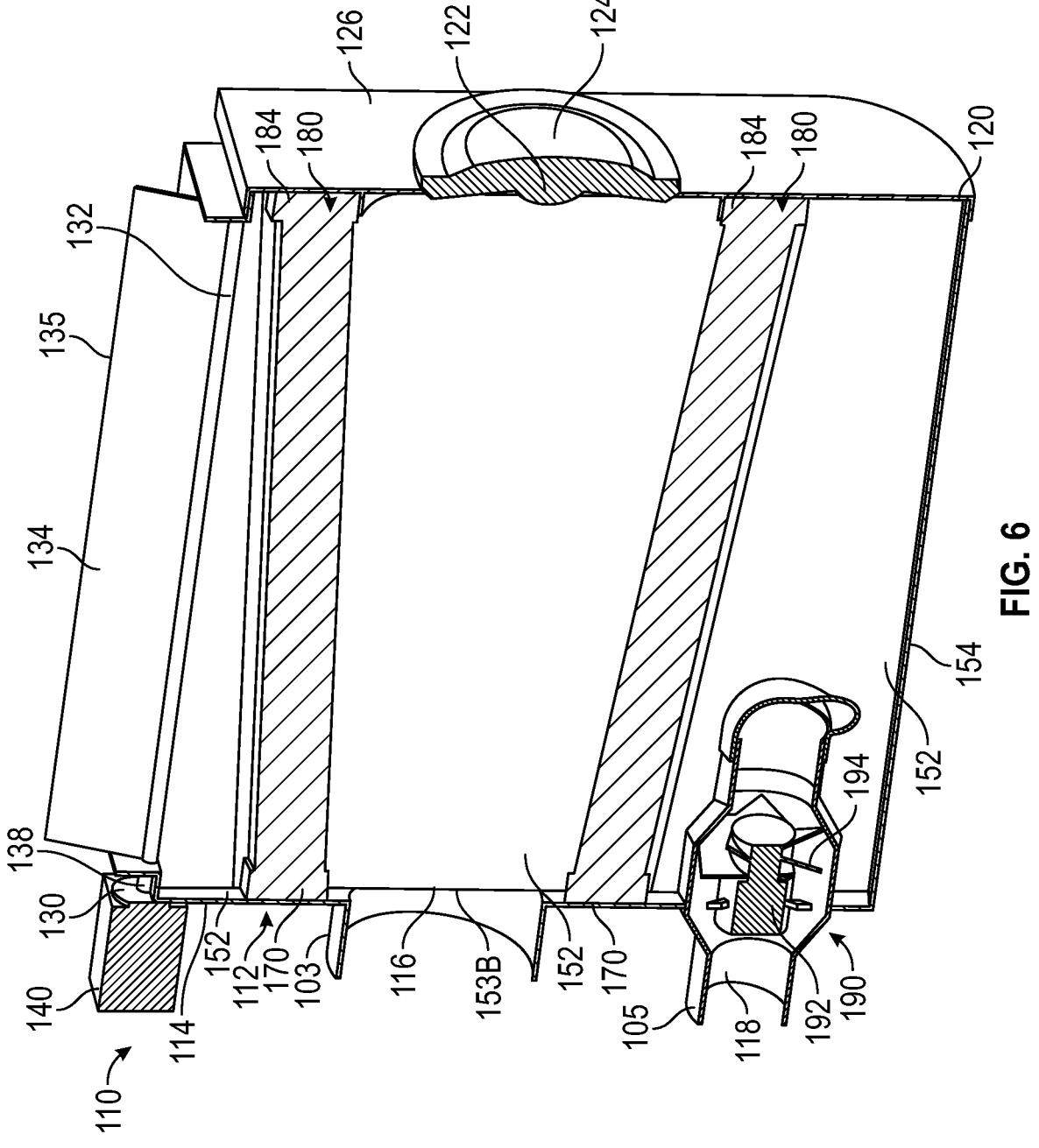
FIG. 6 is a schematic cross-sectional view of an embodiment of an airbox of the present disclosure.

Referring now to FIGS. 3 and 5-6, a central wall 152 extends from the third wall 130 of the housing 112 to an opposed fourth wall 154 thereof. The central wall 152 divides an air chamber 150 positioned between the intake air inlet 132 and the intake air outlet 116 into a first air chamber portion 156 and a second air chamber portion 158. The central wall 152 resides in central plane 153 that is substantially normal to each of the plane 115 occupied by the first wall 114 of the housing 112, the second plane 117 occupied by the second wall 120 of the housing 112, and the third plane 131 occupied by the third wall 130 of the housing 112.

In the embodiment shown in FIG. 3, the debris removal device 124 is fluidly connected to both the first air chamber portion 156 and the second air chamber portion 158, and is configured to, when activated, send air pulses, ultrasonic signals, vibratory signals, and the like into both air chamber portions 156, 158. In another embodiment shown schematically in FIG. 4, debris removal device 124 in the debris removal device module 126 can include a plurality of independently actuatable debris removal devices 124A, 124B. For example, the debris removal device 124A can be fluidly connected to the first air chamber portion 156, and the second debris removal device 124B can be fluidly connected to the second air chamber portion 158.

Figure 4:
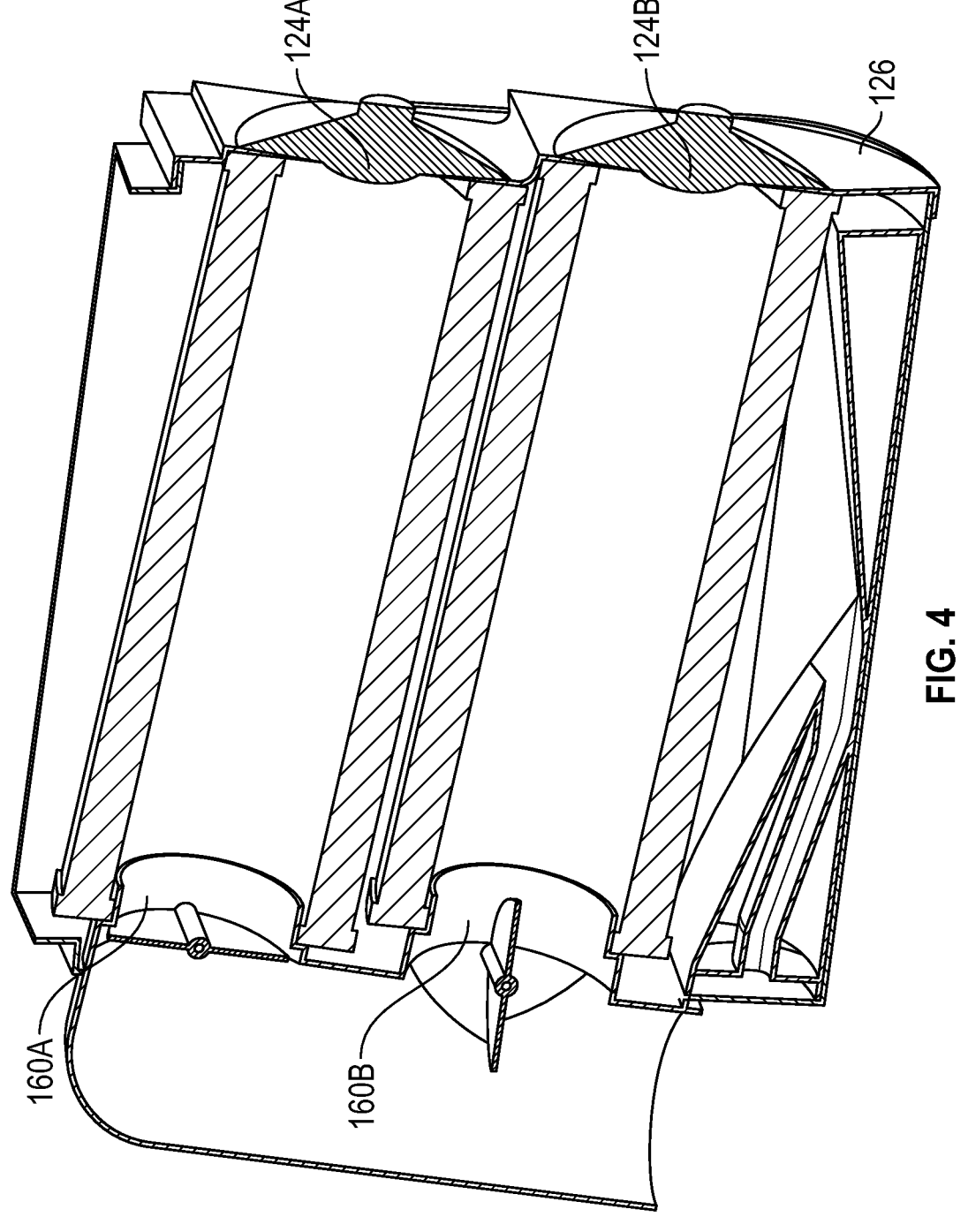
FIG. 4 is a schematic cross-sectional view of an embodiment of a debris removal device suitable for use with an airbox of the present disclosure.

In the example of FIG. 4, the debris removal device 124 includes a first butterfly valve 160A, and the second debris removal device includes a second butterfly valve 160B. The butterfly valves 160A, 160B, can be opened and closed independently so that one or both of the debris removal devices 124A, 124B send cleaning pulses or signals into the respective first air chamber portion 156 and the second air chamber portion 158. The use of dual debris removal devices 124A, 124B allows the first air chamber portion 156 and the second air chamber portion 158 to be cleaned individually, simultaneously, or sequentially.

FIG. 5 is a cross-sectional view along the lines C-C of FIG. 3 and along the plane 153, with the central wall 152 not shown. The second air chamber portion 158 extends from the intake air outlet 116 to the debris removal device inlet 122. The second air chamber portion 158 has a semicylindrical shape, and the first air chamber portion 156 forms a mirror image semicylindrical shape about a central axis 161. The combined shapes of the first and the second air chamber portions 156, 158 form a substantially cylindrical air chamber 150 about the central axis 161. The first and the second air chamber portions 156, 158 each have a first end 157 proximal the intake air outlet 116 and a second end 159 proximal the debris removal device inlet 122, with a radius $r_1$ of the first end 157 being smaller than a radius $r_2$ of the second end 159.

An annular channel 170 extends about the first and the second air chamber portions 156, 158, and forms a receptacle for a removable filtration element 180. The removable air filtration element 180 (see, for example, FIG. 6) may vary widely depending on the intended application, and may made from folded paper, oiled foam, and the like, and combinations thereof. The filtration element 180 is thus positioned between the intake air inlet 132 and the intake air outlet 116 to remove debris from the intake air stream. The removable filtration element 180 has a substantially truncated hollow conical shape sized to wrap about a periphery of the air chamber 150. In one example, the removable filtration element 180 may be inserted into and removed from the annular channel 170 through the second wall 120 of the housing 112, either prior to or after removal of the debris removal device 124 from the debris removal device inlet 122.

When installed in the annular channel 170 in the housing 112, debris lodged in the filtration element 180 is dislodged using pulsed air, vibrational signals, ultrasonic signals, and the like, generated by the debris removal device 124. In some examples, the debris dislodged from the filtration element 180 may fall to the bottom of the housing 112 along the fourth wall 154, or may be removed from the housing 112 with a debris removal apparatus 190.

In some examples, the debris removal apparatus 190 includes a motor 192 connected to an axial or a centrifugal fan 194. The rotating fan 194 produces an exhaust air stream, and debris removed from the filtration element 180 are entrained in the exhaust air stream. Suction from the rotating fan 194 draws the debris entrained in the exhaust air stream from the housing 112 through the debris removal port 118 and the nozzle 105.

In various examples, the housing 112 can include one or a plurality of fans 194, which may be internal or external to the housing 112. For example, the housing 112 can include a single fan 194 connected to multiple debris collectors to provide a central debris scavenge point and associated outlet. In another example, each fan 194 may include a single debris collector to provide multiple debris scavenge points and outlets in the housing 112.

In the example of FIG. 5, the rotating fan is positioned downstream of a collector 196. The collector 196 is in turn downstream of one or more debris collector tubes 198A, 198B (see also FIG. 4). In the example of FIG. 5, the debris collector tubes 198A, 198B have a linear tubular shape, but may have any suitable shape depending on the dimensions of the housing 112. The collector tubes 198A,B include a plurality of perforations 199 configured to collect debris dislodged and ejected from the filtration element 180 by the debris removal device 124.

Referring again to FIG. 4, in some examples the debris removal apparatus 190 can include multiple debris collector tubes 198 located in any area within the housing 112. In the example of FIG. 4, the debris removal apparatus 190 includes debris collector tubes 198A, 198B on opposed sides of the central wall 152. The debris collector tubes 198A, 198B each feed into the collector 196 so that debris expelled from the filtration element 180, and entering the perforations 199, can be entrained in an air stream generated by the axial or centrifugal fan 194 and ejected from the housing 112 via the debris removal port 118 and the nozzle 105.

As noted above, when the damper 134 is moved by the motor 140 into engagement with the sealing edge 136A, the damper 134 seals a first intake air inlet portion 139A and prevents the flow of an intake air stream therethrough, while intake air flow through the second intake portion 139B continues. Debris expelled from a first portion 182 of the filtration element 180 by the debris removal device 124 is drawn into the perforations 199 of the debris collector tube 198A for expulsion from the housing 112. As the first portion 182 of the filtration element 180 is cleaned, intake air flow through a second intake air inlet portion 139B continues so that engine operation can be maintained.

Alternatively, when the motor 140 moves the damper 134 into engagement with the sealing edge 136B, the damper 134 seals the second intake air inlet portion 139B, so that debris expelled from a second portion 184 of the filtration unit 180 by the debris removal device 124 is drawn into the perforations 199 of the debris collector tube 198B for expulsion from the housing 112. The flow of intake air through the first intake air inlet portion 139A continues during the process of cleaning the second portion 184 of the air filtration element 180 so that engine operation can be maintained.

FIG. 6 shows the same view of the airbox 110 as FIG. 5, but includes detail of portion of the central wall 152, and shows the filtration element 180 installed in the annular channel 170. The central wall 152 extends within the central plane 153 from the intake air outlet 116 to the debris removal device inlet 122, and divides or bisects the cylindrical air chamber 150 along a central axis thereof to form the first and second air chamber portions 156, 158. The central wall 152 also extends in the central plane 153 from the annular channel 170 to the intake air inlet 132, and from the annular channel 170 to the fourth wall 154 of the housing 112.

When the damper 134 is moved into engagement with the first sealing edge 136A of the intake air inlet 132, the second intake air inlet portion 139B is fluidly connected with the second air chamber portion 158 and an associated second portion 184 of the filtration element 180 such that a second intake air stream flows therethrough. Alternatively, when the damper 134 is moved into engagement with the second sealing edge 136B of the intake air inlet 132, the first intake air inlet portion 139A is fluidly connected to the first air chamber portion 156, and an associated first portion 182 of the filtration element 180 such that a first intake air stream flows therethrough.

The first portion 139A of the intake air inlet 132 or the second portion 139B of the intake air inlet 132 may be selectively sealed with a moveable damper 134 to block the first intake air stream or the second intake air stream, which in turn occludes either the first air chamber portion 156 and the first portion of the filtration element 182, or the second air chamber portion 158 and the second portion of the filtration element 184. Debris may be removed from the occluded portions of the filtration element with the cleaning device 124 in fluid communication with the first and second portions of the air filtration element 182, 184. The debris dislodged from the filtration element 180 may then optionally be entrained within an exhaust air stream generated by the fan 194 and removed from the airbox housing 112.

During cleaning of the occluded portion of the filtration element, the intake air stream continues to flow through the unoccluded portion of the air chamber and the associated unoccluded portion of filtration element. The flow of the intake air stream into the downstream device through the unoccluded regions of the air chamber and the filtration element allows continued device operation as the filtration element is cleaned, which can reduce device downtime.

FIG. 7 is a flow chart of a method 200 for removing debris from an air filtration element in an airbox of the present disclosure.

The method 200 includes step 202 providing an airbox housing including an intake air inlet, wherein the air inlet has a first portion and a second portion; an intake air outlet, an air chamber between the intake air inlet and the intake air outlet, wherein the air chamber includes a first portion and a second portion, and a filtration element between the intake air inlet and the intake air outlet, wherein the filtration element includes a first portion configured to remove debris from a first intake air stream in the first portion of the air chamber and a second portion configured to remove debris from a second intake air stream within the second portion of the air chamber.

Step 204 of the method 200 includes sealing the first portion of the intake air inlet to occlude the first portion of the air chamber and the first portion of the filtration element while allowing flow of the second air stream through second portion of the intake air inlet, the second portion of the filtration element, and the second portion of the air chamber.

Step 206 of the method 200 includes removing debris from the first portion of the air filtration element.

The airboxes of the present disclosure can be used to remove debris collected by a filtration element upstream of any type of device, and it not limited to use in vehicular applications. The airboxes of the present disclosure are particularly well suited to use in heavy duty construction equipment or other vehicles that operate in dirty and dusty environments where frequent cleaning of filtration elements is required. Some examples of such equipment include, but are not limited to, draglines, excavators, backhoes, skid-steer loaders, tractors, trucks, and the like.

In another embodiment, the present disclosure is directed to a kit including an airbox of the present disclosure and a filtration element configured for insertion into the annular channel of the airbox. In some examples, the filtration element in the kit can be made from folded paper materials, oiled foam, and the like, and has a substantially cylindrical shape. In some examples, the kit further includes fittings that can be used to connect the airbox to an intake system of a vehicle, and instructions for use.

INDUSTRIAL APPLICABILITY

The foregoing airbox assemblies may be used in under-hood applications in heavy duty trucks, tractors, mining equipment, construction equipment, and the like.

What is claimed is:

1. An airbox, comprising:
    an intake air inlet in a housing, wherein the intake air inlet comprises a first portion and a second portion, at least one air outlet in the housing, and an air chamber within the housing, containing a filtration element, and fluidly connected to the intake air inlet and the at least one air outlet, wherein the air chamber comprises an internal wall that divides the air chamber along an axis thereof into a first air chamber portion fluidly connected to the first portion of the air inlet and a second air chamber portion fluidly connected to the second portion of the air inlet, and a moveable air inlet damper upstream of the filtration element configured to seal the first portion of the air inlet and occlude the first air chamber portion, or to seal the second portion of the air inlet and occlude the second air chamber portion.

2. The airbox of claim 1, further comprising at least one debris removal device port in the housing, wherein the at least debris removal device port is fluidly connected to at least one of the first air chamber portion and the second air chamber portion.

3. The airbox of claim 2, further comprising a debris removal device in the at least one debris removal device port, wherein the debris removal device is chosen from ultrasonic, pulsed air, blasted air, vibratory, and combinations thereof.

4. The airbox of claim 3, wherein the debris removal device comprises at least one pulsed air debris removal device.

5. The airbox of claim 1, wherein the first air chamber portion and the second air chamber portion each have a semicylindrical shape with respect to the axis.

6. The airbox of claim 1, wherein the moveable damper comprises a sealing member configured to engage a sealing edge of the air inlet.

7. The airbox of claim 1, further comprising at least one filtration element configured to remove debris from an intake air stream between the intake air inlet and the intake air outlet, wherein the at least one filtration element comprises a first portion configured to remove debris from a first intake air stream within the first air chamber and a second portion configured to remove debris from a second intake air stream within the second air chamber.

8. A method for removing debris from an air filtration element in an airbox for an internal combustion engine, the method comprising:
    providing an airbox housing comprising:
        an intake air inlet, wherein the air inlet comprises a first portion and a second portion;
        an intake air outlet,
        an air chamber between the intake air inlet and the intake air outlet, wherein the air chamber comprises a first portion and a second portion, and
        a filtration element between the intake air inlet and the intake air outlet, wherein the filtration element comprises a first portion configured to remove debris from a first intake air stream in the first portion of the air chamber and a second portion configured to remove debris from a second intake air stream within the second portion of the air chamber;
    at a location between the intake air inlet and the air chamber, sealing the first portion of the intake air inlet to occlude the first portion of the air chamber and the first portion of the filtration element while allowing flow of the second air stream through second portion of the intake air inlet, the second portion of the filtration element, and the second portion of the air chamber; and removing debris from the first portion of the air filtration element.

9. The method of claim 8, wherein removing the debris from the first portion of the air chamber comprises pulsing air into the first portion of the air chamber to dislodge debris from the first portion of the air filtration element.

10. The method of claim 9, further comprising generating an exhaust air stream and entraining debris dislodged from the first portion of the air filtration element in the exhaust air stream.

11. The method of claim 10, wherein the exhaust air stream is generated with at least one of an axial fan, a centrifugal fan, or a combination thereof.

12. A modular airbox system, comprising:

a housing, comprising:

a central interior wall in a central plane;

opposed first and second walls, each in a plane substantially normal to the central plane, wherein the first wall comprises at least one intake air outlet and the second wall comprises at least one debris removal device inlet, a substantially cylindrical air chamber fluidly connected between the at least one intake air outlet and the at least one debris removal device inlet, wherein the central interior wall divides the air chamber to form a first air chamber portion and a second air chamber portion, and wherein the each of the first air chamber portion and the second air chamber portion have a substantially semi-cylindrical shape, an annular channel about an external surface of the air chamber, and an intake air inlet in a third wall substantially normal to the first wall, the second wall, and the central interior wall, wherein the intake air inlet is fluidly connected to the first air chamber portion and the second air chamber portion, and wherein the air intake comprises a first intake air inlet portion and second intake air inlet portion, and moveable damper in the air intake inlet and upstream of the substantially cylindrical air chamber, wherein the damper is configured to seal against an interior wall of the housing and occlude either:

the first intake air inlet portion and the first air chamber portion, or the second intake air inlet portion and the second air chamber portion.

13. The system of claim 12, wherein the housing further comprises a debris removal port in the first wall, wherein the debris removal port is fluidly connected to the air chamber.

14. The system of claim 12, wherein the cylindrical air chamber has a first end at the intake air outlet and a second end at the debris removal device inlet, and wherein a radius of the second end of the cylindrical air chamber is greater than a radius of the first end of the cylindrical air chamber.

15. The system of claim 12, wherein the moveable damper comprises a sealing member configured to engage the interior wall of the housing.

16. The system of claim 12, further comprising a removable filtration element in the annular channel, wherein the filtration element is configured to remove debris from an intake air stream flowing between the intake air inlet and the intake air outlet.

17. The system of claim 16, wherein the filtration element comprises folded paper.

18. The system of claim 12, wherein the intake air outlet terminates in a nozzle extending from an exterior wall of the housing.

19. The system of claim 12, further comprising at least one debris removal device mounted in the debris removal device inlet, wherein the debris removal device is chosen from ultrasonic, pulsed air, blasted air, vibratory, and combinations thereof.

20. The system of claim 19, wherein the debris removal device comprises a first debris removal device fluidly connected to the first air chamber portion and a second debris removal device fluidly connected to the second air chamber portion.

21. The system of claim 20, further comprising a fan in the debris removal port, wherein the fan is configured to form an exhaust air stream to entrain debris for removal through the debris removal outlet.

* * * * *